Figure 1:
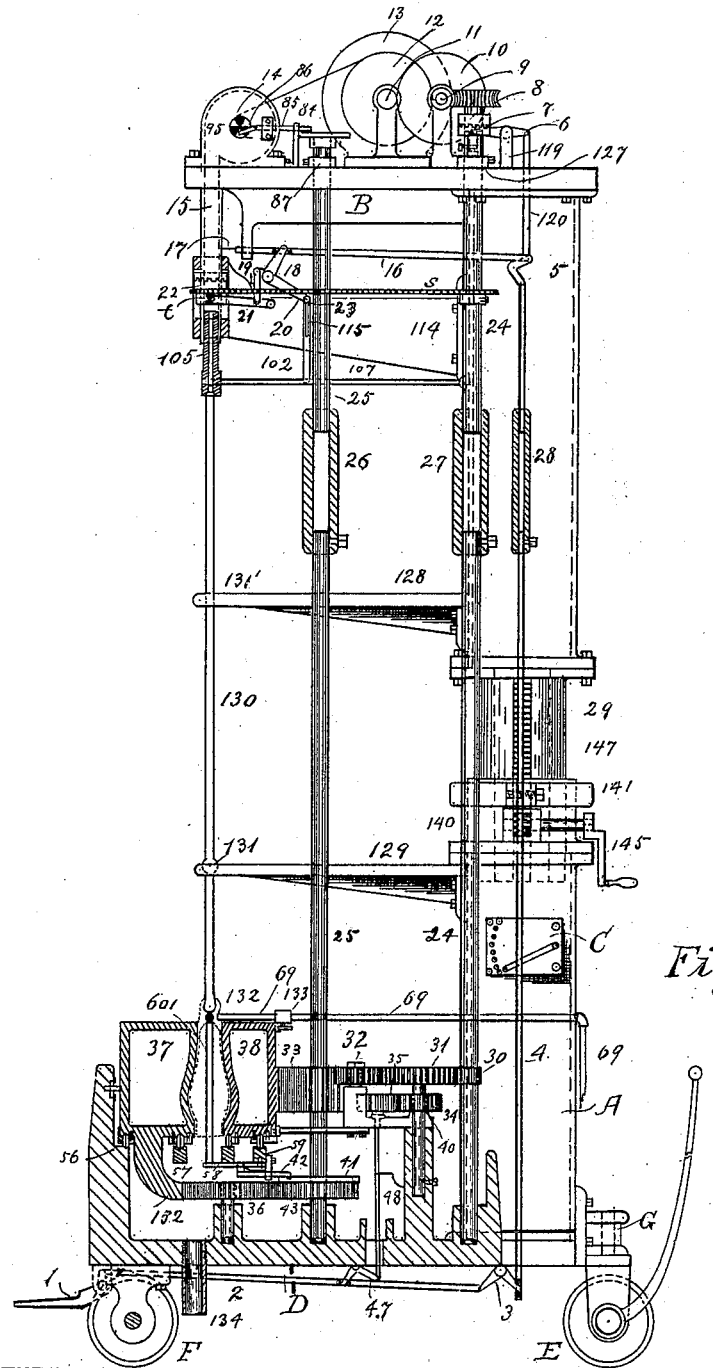

No. 621,795. Patented Mar. 28, 1899.
I. W. COLBURN.
GLASS WORKING MACHINE.
(Application filed Feb. 28, 1898.)
(No Model.) 5 Sheets—Sheet 1.

WITNESSES.
J. M. Fowler Jr.
Walter B. Payne.

INVENTOR.
Irving W. Colburn
by Henry H. Bates
atty.

No. 621,795. Patented Mar. 28, 1899.
I. W. COLBURN.
GLASS WORKING MACHINE.
(Application filed Feb. 28, 1898.)

(No Model.) 5 Sheets—Sheet 2.

WITNESSES
J. M. Fowler Jr
Walter B. Payne

INVENTOR.
Irving W. Colburn,
by Henry H. Bates, atty.

No. 621,795. Patented Mar. 28, 1899.
I. W. COLBURN.
GLASS WORKING MACHINE.
(Application filed Feb. 28, 1898.)
(No Model.)
5 Sheets—Sheet 3.
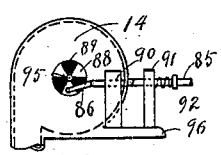
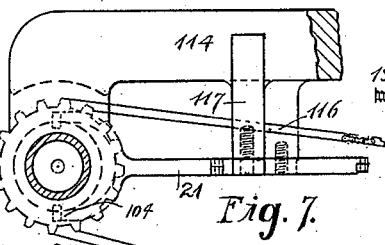
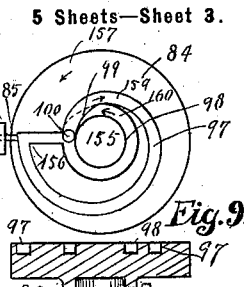
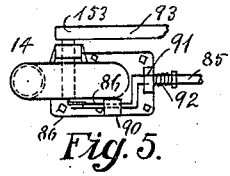
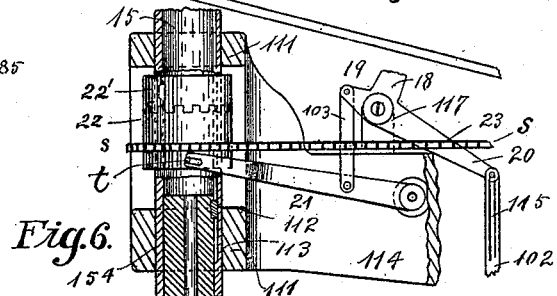
WITNESSES.
J. M. Fowler Jr
Walter B. Payne
INVENTOR
Irving W. Colburn
by Henry H. Bates
his atty
THE NORRIS PETERS CO., PHOTO-LITHO., WASHINGTON, D. C.

No. 621,795. Patented Mar. 28, 1899.
I. W. COLBURN.
GLASS WORKING MACHINE.
(Application filed Feb. 28, 1898.)
(No Model.) 5 Sheets—Sheet 4.
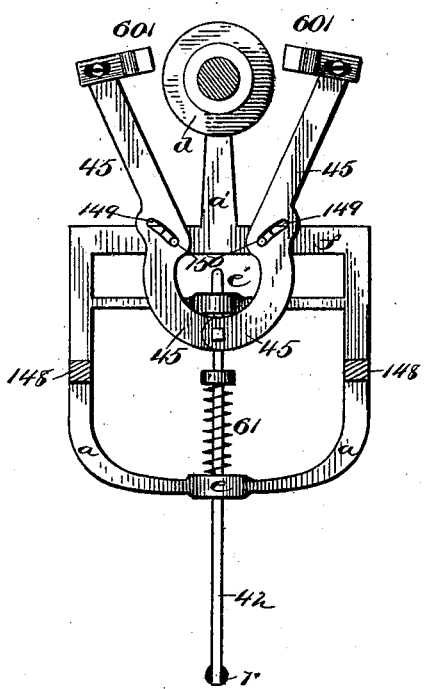
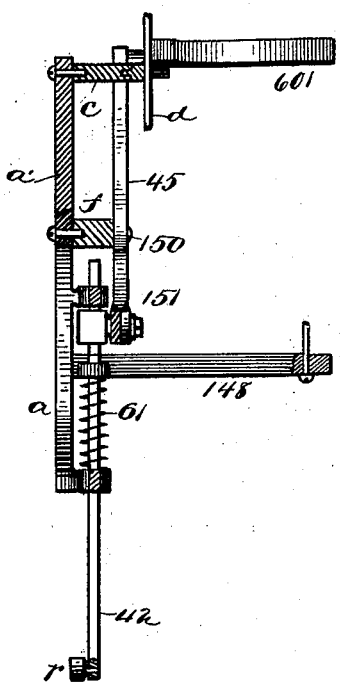
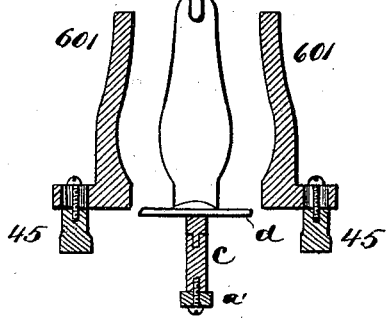
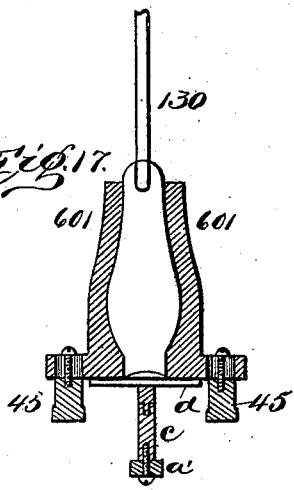
Witnesses:
J. M. Fowler Jr.
Walter B. Payne.
Inventor
Irving W. Colburn
by Henry H. Bates
his Attorney No. 621,795. Patented Mar. 28, 1899.
I. W. COLBURN.
GLASS WORKING MACHINE.
(Application filed Feb. 28, 1898.)
(No Model.) 5 Sheets—Sheet 5.
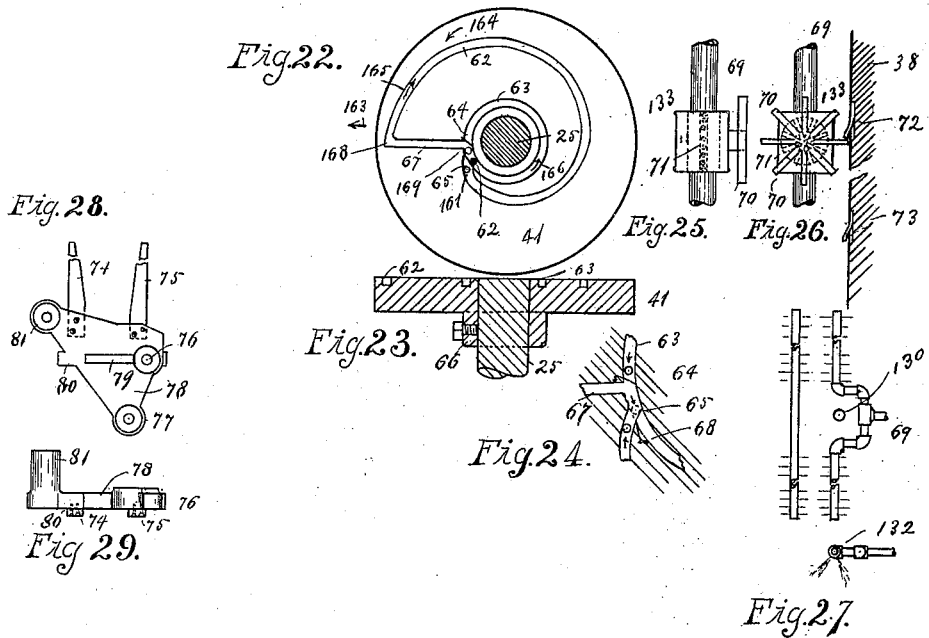
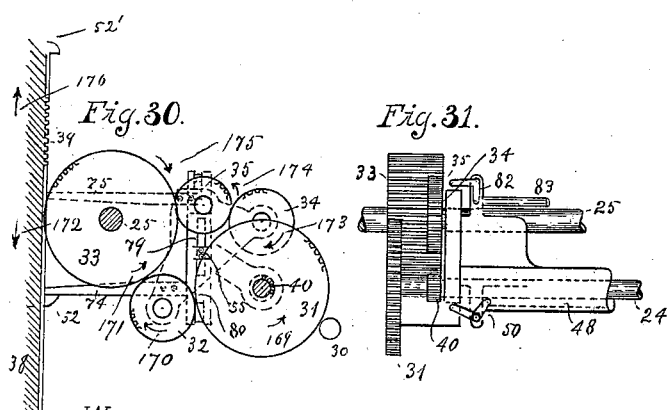
WITNESSES
INVENTOR.
Irving W. Colburn
by Henry H. Bates
his Attorney.

UNITED STATES PATENT OFFICE.

IRVING W. COLBURN, OF TOLEDO, OHIO.

GLASS-WORKING MACHINE.

SPECIFICATION forming part of Letters Patent No. 621,795, dated March 28, 1899.

Application filed February 28, 1898. Serial No. 671,996. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

This invention relates to a novel means or apparatus for forming or manufacturing articles of glass, such as have heretofore been made by blowing in connection with sectional molds, either by purely manual process or in conjunction with machinery. By my present method I dispense entirely with molds and form the article by means of longitudinally-traversing formers, one or more, in moving contact with the mass of hot plastic glass, suitably supported so as to rotate as the former or formers travel by it, said formers bearing on their contact-faces the reverse configuration from that which it is designed to impress upon the glass article. The formers are arranged to be positively reciprocated, and when there are two they move simultaneously in opposite directions, the rotating mass of plastic glass being between them. When only one is used, some means is employed on the side opposite to the movable former to give counter-support to the article, which may be a roller or cylinder suitably configured on its surface, or in some cases even a fixed support, the latter being paste-covered, if desired. The plastic glass is commonly supported between the reciprocating formers by means of a gathering-iron, preferably tubular, to serve for introducing air within the mass of glass to fill the cavity as it expands, said air being introduced either under pressure, to positively expand the glass, or passively. The said gathering-iron or blow-iron is arranged so as to be positively rotated, with its mass of glass attached, or the glass may be passively rotated by frictional contact with the formers alone. The surface of the moving glass usually travels in the same direction with that of the forming-surface in contact with it. One travel of the formers, in which the rotating glass comes in contact with the whole length of the face of each former, is ordinarily sufficient to finish the article and complete the operation, which is automatic. The formers travel on parallel ways and preferably have their working faces inclined to the plane of travel in order to allow room for the mass of glass to expand in volume as the operation progresses. Other shapes than cylindrical may be made on this apparatus by giving a suitable configuration to the faces of the traveling formers. Screw-threads may also be formed on portions of the article by giving the proper configuration to corresponding portions of the moving formers.

It is not absolutely necessary for the reciprocating formers to be planes or to travel on straight ways. They may be formed on the arcs of parallel circles, in which case the trackways would be curved to correspond. One of the formers may also be held stationary, in which case the mass of plastic glass is arranged to move differentially to accomplish the same result. In conjunction with these reciprocating formers I employ auxiliary formers, (illustrated in Fig. 17,) whose function and mode of operation are hereinafter described.

Figure 2:
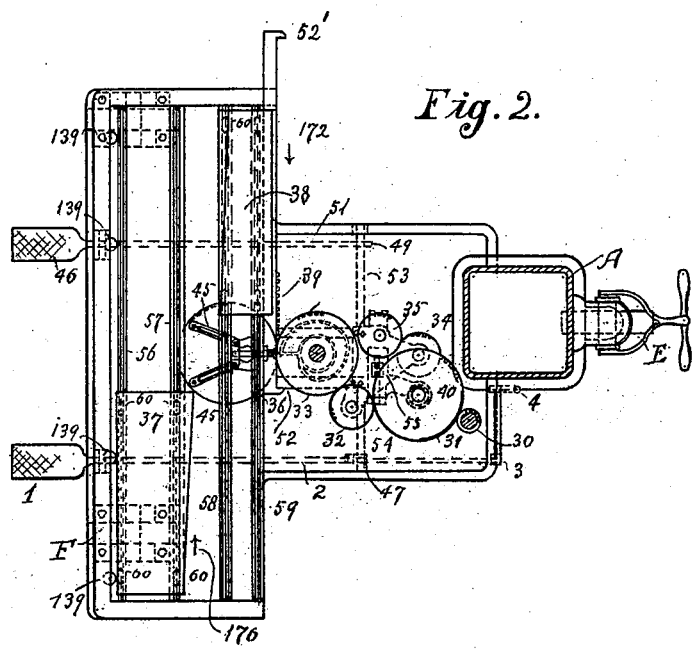
Figure 3:
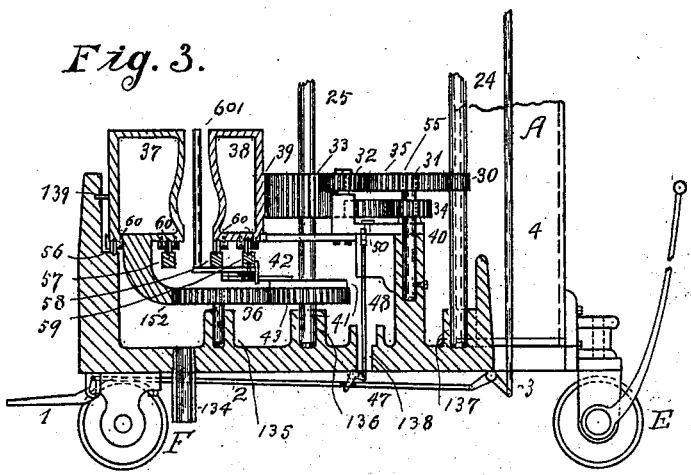

In the drawings forming a part of this specification, Figure 1 is a side elevation of the apparatus, partly in section. Fig. 2 is a plan view of the lower part of the machine, partly in section. Fig. 3 is a side elevation of the lower part of the machine, partly in section. Fig. 4 is a side elevation of the air-blower. Fig. 5 is a plan of the air-blower. Fig. 6 is a side elevation, partly in section, of the air-spindle that revolves the blow-iron with its support and accessories. Fig. 7 is a plan of Fig. 6. Fig. 8 is a plan of the device for lifting the spindle. Fig. 9 is a plan of the cam that controls the admission of air into the blower. Fig. 10 is a central vertical section of the cam, Fig. 8. Fig. 11 is a plan of the union of the runways of the cam, Fig. 9. Fig. 12 is a side elevation of the double bell-crank which lifts the spindle and operates the clutch that revolves the spindle. Fig. 13 is a plan of Fig. 12. Fig. 14 is a plan of the controlling device of the slickers. Fig. 15 is a side elevation of same. Fig. 16 is a front elevation of the slickers in open position and the central support. Fig. 17 is a front elevation of the slickers in closed position. Fig. 18 is a plan, partly in section, of the device for shortening or lengthening the main column of the machine. Fig. 19 is a front elevation of same. Fig. 20 is a side elevation of same. Fig. 21 is a side elevation of scheme for operating clutch controlling main line-shaft of the machine. Fig. 22 is a plan of the cam which controls the action of the slickers. Fig. 23 is a vertical section of same. Fig. 24 is a plan of the union of the runways of the said cam. Fig. 25 is a side elevation of the valve controlling the water for sprinklers. Fig. 26 is a plan of same. Fig. 27 shows details of the sprinklers in plan and end elevation. Fig. 28 is a plan of the base supporting the gears that act as the reverse motion for the second main vertical line-shaft. Fig. 29 is a side elevation of same. Fig. 30 is a plan showing the train of gears transmitting motion and reverse motion from first vertical line-shaft to second vertical line-shaft and also giving motion to the vertical forming and supporting slickers. Fig. 31 is a rear elevation of same, showing bell-cranks for controlling the reverse motion.

Like letters and numerals refer to like parts on the several figures.

Referring to the drawings, D is the base of the machine, mounted for convenience and portability on truck-rollers E F, (one not shown,) roller E being swiveled at G. A is an upright main standard borne on this base, having an overhanging arm B for supporting the upper mechanism. Standard A is made extensible for adjustment to different species of work by means of cylindrical portion 29, fitting into cylindrical socket 140, the former carrying rack 147, which can be adjusted up and down in the socket by means of the pinion 143 and winch 145. When at the proper height, it is retained in position by clamp-collar 141, constrained by clamping-bolt 142 or other suitable means. Corresponding adjustments as to height are also made in vertical shafts 25, 24, and 4 by means of sleeves 26, 27, and 28 and suitable clamping-screws.

Motive power can be supplied to this machine from any convenient source; but electrical power is preferred, as illustrated in the drawings.

13 represents the electric motor, located on overhanging arm B.

14 is a fan-blower for supplying air to the air-spindle and blow-iron. Motion is transmitted to the rotary blower from the motor through pulley 12 and belting and to a main rotary shaft 24 through spur-gears (indicated by circles 11 and 10) to worm 9 and worm-wheel 8 on said rotary shaft. Motion is transmitted from main rotary shaft 24 to a second upright rotary shaft 25 through gears 30 31 32 33. Both of shafts 24 25 are stepped on ball-bearings at the foot. On top of shaft 25 is rotary cam 84 for automatically controlling the air-pressure delivered to the blow-iron by the blower. From the blower extends a vertical conduit 15 downward to where sliding and rotary connection is made with it by the air-spindle 105.

Rotary motion of the air-spindle is obtained by means of sprocket-and-chain gear from line-shaft 24. This motion is imparted to vertical sleeve 154, Fig. 6, through clutch 22, and thence from said sleeve 154 to spindle 105, which is keyed and splined to said sleeve, so that it has about eight or nine inches vertical movement. Clutch 22 is thrown in by rod 16 lifting bell-crank 18 19, connecting with lever 21. Simultaneously it is required that spindle 105 drop and connect with blow-iron presented to it. To do this, the end 23 of bell-crank allows slotted rod 102 to drop, thus lowering pivoted lever-arm 107, which controls height of air-spindle. A slot 115 is formed in rod 102, made to allow the lifting of spindle 105 when removing blow-iron from the machine without stopping machine. Lever 107 is held at the other end on a pivoted center on main vertical column A.

Clutch 7 on main rotary shaft 24 is separated by lever 6, which is controlled by rod 120, as seen in Fig. 21. The main shaft is broken at the clutch, so that a reduced portion 121 of 118 projects into 24 and rests on ball-bearing 124. Set-screw 123 holds the two parts 118 and 24 together by means of a channel cut in 121, into which said set-screw projects.

The fan runs continually, and its supply to the blow-iron is controlled, first, by valve 17, which is a simple gate or cut-off in conduit 15, controlled by bell-crank 5 on shaft 4; second, by cutting off the source of supply as it enters the blowers. This cutting off is effected by making the casing for the fan air-tight with the exception of a register on one or both sides, with sector-shaped openings closed by a centrally-pivoted cut-off actuated by the crank-rod 85 and return-spring 92, controlled by cam-grooves of cam 84. 99 is a gate in the said cam-groove for stopping the passage of the guide-pin except in one direction. Said cam thus regulates the pressure of the blast of air automatically by controlling the amount of air admitted to the fan.

Cam 84 for controlling admission of air to the fan consists of a flat plate with camways 98 and 97 cut in it. It is required that this cam make one turn in direction of the arrow 157, causing a gradual increase of air-pressure until a maximum is reached just before the cycle of operation is completed, then a sudden and complete cut-off of air and one revolution in the reverse direction with air-pressure equal to zero, &c. The "trolley" or guiding-pin, which moves in the cam-slot and controls the opening and closing of the register of the fan, follows the path from position 100 in direction of the arrow 159, passing gateway 99, which is held in that position by a spring. When it reaches position 156, it suddenly springs to position 100 again. The reverse motion of the cam now commences, and the trolley simply passes around in direction of the arrow 160, pushing its way past gate 99, which yields readily.

37 38 are the reciprocating formers, preferably made hollow, as shown in Fig. 3, or they may be filled with any suitable substance to regulate temperature. They move on rollers 60, running on parallel ways 56 57 58 59, former 38 being actuated by gear 33 on rotary shaft 25, meshing with rack 39, and former 37 being actuated by gear 36, meshing with rack 152. In Fig. 2 they are shown in position of starting, about to move in the direction of arrows 172 and 176, the plastic glass being held centrally between them on blow-iron 130, as in Fig. 1. In conjunction with these reciprocating formers are used the auxiliary devices or slickers 601, standing on each side of the article of plastic glass, as shown in Fig. 17, and capable of separation and contraction from and toward the said article as it forms. Said slickers are borne upon the ends of arms 45, slotted, as at 149, pivoted at 151 to a rod 42, playing back and forth in bearings $e$ $e'$ on stationary frame $a$, attached by arms 148 to trackway 59. In the cam grooves or slots 149 are upright pins with rollers affixed to cross-bar $f$ of frame $a$. $a'$ is an extension-arm bearing the central slicker-support or bottom former.

At the extremity of rod 42 is a pin $r$ with antifriction-roller, which plays in the cam-groove of cam 41 to regulate the backward-and-forward movement of rod 41, so as to open and close the slickers at the proper times and at the same time approximately preserve parallel motion in the slickers to and from the article between. This is controlled by the form of cam-grooves 149, playing in the stationary pins 150, in conjunction with the form of cam-groove 62, cut in the top of cam 41. This cam 41, Figs. 22 and 23, is a horizontal disk borne on shaft 25, having cam-grooves 62 63 67 cut in its upper surface, in which travels the guide-pin or trolley $r$ at the end of bar 42. In this way the bar 42 (which has a returning-spring 61 on its stem) is pushed longitudinally out and in in accordance with the law of the formation of the cam, thus contracting and expanding the distance between slickers 601 to and from the rotating mass of glass held between them. The slickers thus coöperate with the reciprocating formers in modeling the article to the required shape. Said slickers are preferably made with their faces of contact curved where they encounter the moving surfaces of the glass.

The cam-groove 62 has a constant convergence toward the center, while cam-groove 63 is circular and cam-groove 67 is radial, or nearly so. At the juncture of cam-groove 62 with groove 63 there is a spring-gate 65, and at the juncture of grooves 67 and 63 there is a spring-gate 64, serving the purpose of guiding the trolley differently on reversal from the path followed in direct course. The trolley starts at position 169 and has a constant tendency to spring out in direction 163. The cam 41 turns one revolution in direction of the arrow 164, then one in the reverse direction. The slickers should be wide open when the machine begins work, but should immediately close in upon the glass, then gradually open as the glass expands. Near the end of the first revolution the slickers should be quite wide apart and should suddenly open wider, so that the glass may be removed from the machine. This is accomplished by the form of the cams. The slickers remain wide open until the forward motion is once more begun, when it repeats.

The trolley starts from position 169, suddenly takes position 168, and pursues the direction of the arrow 165 until position 161 is gained. It crowds its passage through gate 65 and regains position 169. The cam now reverses motion, and the trolley starts around in direction of the arrow 166, passing gate 65, which is held wide open by a spring, and crowds its way past gate 64, and thus regains its original position after completing two revolutions, one in each direction.

Figs. 25 and 26 give two views of the valve for controlling the spray for vertical formers. Springs 72 and 73 are set into top of reciprocating former 38. 73 knocks one arm of valve along, opening the valve. 72 comes along and knocks another arm, thus closing valve again. When the former passes in the other direction, these springs do not affect the valve-arms, as they simply spring under them.

Fig. 27 illustrates in plan and end view the arrangement of the spraying-pipes, which are located just above the path of the reciprocating formers and play water upon them to wet and cool them at the proper intervals through the action above described. Their position is illustrated in Fig. 1, and the pipe 69 leads from any suitable source of supply. 134 is a waste-pipe for carrying off the water from the spray.

In Figs. 28 to 31, inclusive, are shown details of the device for reversing the direction of motion of rotary shaft 25 at the proper time for changing the direction of motion of the reciprocating formers which said shaft governs. Figs. 28 29 show the plan and elevation of the reciprocating base which supports the gears. 78 is the base-piece, triangular in form, slotted at 79, a fixed piece 59 traveling in said slot and allowing reciprocating motion to the base-piece. Said base-piece carries arms 74 75, extending to reciprocating former 38, and also carries three studs 76 77 81, bearing, respectively, gears 35, 34, and 32. The traversing former 38 has projections 52 and 52', which come in contact with arms 74 and 75, respectively, and move the base-piece to and fro accordingly. When it is moved in direction of the arrow 176, spur-gears 34 35 become disengaged from gears 40 33 and the machine stops. If the motion were continued, gear 32 would come into mesh with gears 31 and 33, causing rotary motions in direction of arrows 169, 170, and 171, respectively. Now by stepping on pedal 1 bell-crank 50 brings gears 31 32 33 into engagement, causing rack 39 and vertical former 38 to move in direction of the arrow 172 and former 39 to move in the opposite direction until stop 52' strikes arm 75 and throws out the gears into a neutral position again. By stepping on pedal 46 bell-crank 82 pushes slide 78 until gears 40 34 35 33 mesh, causing rotary motions in directions of arrows 169, 173, 174, and 175, respectively, and vertical former 38 to move in the opposite direction from the one previously described. The vertical formers in each case pass each other in opposite directions.

C is the rheostat for gradually applying the electric current to the armature of the motor, which is turned on by hand. The machine runs continually when once started, the intermittent periods being governed, as heretofore explained, by shift of gears automatic and by treadle.

The reciprocating formers may have screw-thread patterns on a portion of their working faces when it is designed to have screw-threads on the article.

The clutch which operates the air-spindle is shown in detail in Fig. 6. The shell 154 is held rotatively in bearings 111 and revolves in air-conduit 15. The portion 22' of the clutch is fast to this shell. The portion 22 of the clutch is loose on the shell and is rotated by means of chain s. On this part 22 is a ring, held in collars bearing trunnions t, which serves to raise clutch 21 up and down while rotating by means of forked lever 21. Rotary motion is thus imparted at will to shell 154. The air-spindle proper plays up and down within this shell, being keyed and splined to it, (spline 113,) and it has a collared and trunnioned ring 109, by which it can be separately raised while rotating by means of forked arm 107.

Operation of machine: While the machine is at rest, the vertical formers are in position, as shown in Fig. 2, the slickers are spread wide apart, and the motor is stopped. By throwing on current at the rheostat by hand the motor is started, including fan and gears 11 10 9 8, clutch 7 being open. All else remains at rest until the foot is placed on pedal 1, which pulls upon rod 2, thus operating bell-crank 3, rod 4, rod 120, lever 6, throwing in clutch 7, starting main rotary shaft 24. Rod 4 at the same time, through bell-crank 5, operates rods 16, opening air-gate 17, so that air can pass from the blower or fan as soon as regulating-valve permits, with free access to air-spindle and thence to blow-iron. Bell-cranks 18 and 19 control link 103 and lever 21, engaging clutch 22, which sets air-spindle 105 in motion. Said clutch receives its motion through sprocket and chain from shaft 24. Simultaneously with the throwing in of clutch 22 bell-crank 20, connected with pivoted arm 107 by slotted link 102, allows the air-spindle 105 to fall, joining up said spindle and blow-iron. Rod 2 also operates bell-cranks 47 and rod 48, which throws over bell-crank 50, Fig. 31, pushing base 78, so that gear 32 is made to mesh with 31 and 33, giving 33 motion in direction of 171 and moving former 38 in direction 172. As operator steps on treadle 1 he places blow-iron, with gathered glass, into seats 131 and 131', while centrally locating same. Air-spindle 105 connects with blow-iron and revolves it. Vertical former 38 begins to travel in direction 176, the forming-surfaces of the same spreading as they advance. The slickers, as cam 41 on rotary shaft 25 begins to turn in direction 164, suddenly close about the hot glass, and as the blowing continues the cam continues to turn, gradually opening the slickers. When 25 has made nearly one revolution, the slickers open suddenly to their full extent and the glass and blow-iron may be removed. Meantime the blast of air to blow-iron has been controlled by cam 84, causing a gradual increase of pressure from zero to maximum, suddenly cutting off entirely just before the first revolution of 25 is completed. At end of first revolution of 25 knocker 52' strikes arm 75 and throws gear 32 out, and the gears remain in a neutral position until the operator reverses the motion. The helper has removed the blow-iron with blown glass article from the machine. He now steps on treadle 46, pulling rod 51, Fig. 2, thus operating bell-crank 49, shaft 53, rod 83, Fig. 31, and bell-crank 82, which throws in gears 40 34 35 33, revolving 25 in direction 175 and moving each former backward toward the original position again. Air-cam and slicker can remain at rest, so that neither operates to effect a change, blast remaining off and slickers wide apart. As spring 73 passes water-valve 133 the valve is opened and spray plays on vertical formers to wet and cool the same, until spring 72 engages a valve-arm and closes the valve. The springs in passing in the other direction simply ride by the valve-arms by springing under the same without engaging the arms. The machine continues its reverse motion until it returns to its original position, then stops, ready to repeat the same operations.

I claim and desire to secure by Letters Patent—

1. In a glass-working machine, one or more reciprocating formers for operating on plastic glass, supported on ways so as to freely traverse, in combination with means for supporting a mass of plastic glass in moving contact therewith, substantially as specified.

2. In a glass-working machine, a pair of reciprocating formers supported on ways so as to traverse in opposite directions, the inner faces of said formers being shaped and formed in the inverse sectional shape of the article to be modeled in plastic glass, in combination with means for supporting a mass of plastic glass in moving contact with the faces of said formers, substantially as specified.

3. In a glass-working machine, a pair of reciprocating formers arranged to traverse on ways in opposite directions, in combination with means for rotating a mass of plastic glass in moving contact with the inner faces of said formers, substantially as specified.

4. In a glass-working machine, a pair of reciprocating formers arranged to traverse in opposite directions on parallel ways, having patterned plane faces slightly inclined to the plane of travel, in combination with means for supporting a mass of plastic glass in moving contact with said patterned faces, and means for expanding said glass as the interval between said faces expands by the linear progress of the said formers, substantially as specified.

5. In a glass-working machine, in combination, a pair of reciprocating formers arranged to traverse in opposite directions, means for supporting and rotating a mass of hot plastic glass in moving contact with the traversing surfaces of said formers, and means for automatically wetting and cooling the said formers while traversing, substantially as specified.

6. In a glass-working machine, upright reciprocating formers, one or more, supported so as to freely traverse, in combination with means for supporting a mass of plastic glass in moving contact therewith, and separate devices for operating on said plastic glass simultaneously, substantially as specified.

7. In a glass-working machine, a pair of upright reciprocating formers arranged to traverse in opposite directions on parallel lines, the inner faces of said formers being slightly inclined to the line of travel, in combination with means for supporting and rotating a mass of plastic glass in moving contact with said inner faces, means for expanding the glass while rotating, separate devices for operating on the plastic glass interposed between the working faces of said reciprocating formers, and means for expanding and contracting said separate formers to and from the plastic glass under treatment, substantially as specified.

8. In a glass-working machine, in combination, a removable gathering-iron, upright formers arranged to traverse in opposite directions, and means for rotating said gathering-iron and reciprocating said formers simultaneously, substantially as specified.

9. In a glass-working machine, in combination, a removable blow-iron, upright formers arranged to traverse in opposite directions, and means for rotating said blow-iron, for supplying air thereto under graduated pressure, and for reciprocating said formers simultaneously, substantially as specified.

10. In a glass-working machine, in combination, a removable blow-iron, means for rotating the same and supplying air thereto under regulated pressure, formers traversing on parallel ways, having patterned faces slightly inclined to the plane of said ways, whereby the interval between said faces increases and diminishes as the formers pass each other, means for reciprocating said formers in opposite directions, and means for automatically stopping said formers at the end of their respective lines of travel, and at the same time stopping the rotation of said blow-iron, substantially as specified.

11. In a glass-working machine, in combination, a removable blow-iron, means for rotating the same and supplying air thereto under regulated pressure, a bottom support for a mass of plastic glass borne on the end of said blow-iron, and upright slicker-formers, shaped to fit the vertical section of the glass article to be formed, and convex horizontally on their inner faces, substantially as specified.

12. In a glass-working machine, in combination, a removable blow-iron, means for rotating the same and supplying air thereto under regulated pressure, upright slicker-formers shaped to fit the vertical section of the glass article to be formed, and means for automatically expanding and contracting said slicker-formers to and from a mass of glass borne on the end of the blow-iron between said formers, substantially as specified.

13. In a glass-working machine, in combination, a removable and rotatable blow-iron, means for supplying air thereto, reciprocating upright formers arranged to traverse in parallel ways in opposite directions, means for increasing and diminishing the distance between said formers while traversing, upright auxiliary slicker-formers arranged between said reciprocating formers, means for automatically expanding and contracting the distance between said auxiliary formers, and means for simultaneously rotating the blow-iron, reciprocating the traversing formers in opposite directions, and automatically arresting the said movements periodically, substantially as specified.

14. In a glass-working machine in combination, a removable blow-iron, a motor, an air-blast generator connected with the blow-iron operated by said motor, a valve or valves for admitting or excluding a supply of air to or from said blast-generator, thereby varying the air-pressure in the said blow-iron, and automatic means connected with said motor for operating said air valve or valves, substantially as specified.

15. In a glass-working machine, in combination, a removable blow-iron, means for rotating the same and supplying air thereto, and upright slicker-formers, shaped to fit the vertical section of the glass article to be formed, substantially as specified.

16. In a glass-working machine, in combination, a removable blow-iron, an air-blast generator communicating with said blow-iron, a gate or valve for admitting and cutting off the admisssion of the air-blast to said blow-iron, and means for automatically controlling and regulating the admission of air to said blast-generator in variable quantities, whereby the air-pressure in said blow-iron is correspondingly controlled in variable degree, substantially as specified.

17. In a glass-working machine, in combination, a removable blow-iron, a means for generating a blast of air and supplying it to said blow-iron, means for cutting off said air-supply and admitting the same to the blow-iron as desired, and automatic means for controlling and regulating the admission of air to said blast-generator in variable quantities, whereby the air-pressure in said blow-iron is correspondingly controlled in variable degree, substantially as specified.

18. In a glass-working machine, in combination, a rotary fan, a blow-iron, a conduit for supplying air to said blow-iron from said fan, a gate or cut-off in said conduit, a register for admitting air in variable amounts to said fan, and automatic means for regulating and controlling the said register, substantially as specified.

19. In a glass-working machine, in combination, an air-spindle, a removable blow-iron, a motor, a means for generating a blast of air and supplying it to said air-spindle, and automatic means operated by said motor, between it and the blast-generator, for regulating the supply of air to said blast-generator, and thus varying the air-pressure in said air-spindle, substantially as specified.

20. In a glass-working machine, in combination, a motor, a rotary fan driven by said motor, an air-spindle taking air from said fan, an air-valve for admitting or excluding air in regulated amounts to or from said fan, and automatic means operated by said motor for regulating and controlling said air-valve, substantially as specified.

21. In a glass-working machine, in combination, an electric motor, a rheostat, a main rotary shaft 24 continuously driven by said motor, a second rotary shaft 25 intermittently driven by said motor, a clutch mechanism 7 for throwing the main rotary shaft into gear with the motor, sliding gears for connecting and disconnecting the second rotary shaft 25 to and from the main rotary shaft, a treadle for operating said clutch 7, a treadle for operating the said sliding gears, and reciprocating formers intermittently driven by said second rotary shaft 25 substantially as specified.

22. In a glass-working machine, in combination, reciprocating upright formers arranged to traverse in opposite directions on parallel ways, means for supporting and rotating and supplying air to a mass of plastic glass between said reciprocating formers, a double line of spray-pipes arranged above said reciprocating formers near the line of travel thereof, and means for intermittently turning on and off the spray from said formers, operated by the movement of the formers, substantially as specified.

23. In a glass-working machine, in combination, a motor, an air-blast generator, an air-conduit therefrom, an air-gate in said conduit, an air-spindle, capable of up-and-down movement in said conduit, means for rotating said air-spindle, a clutch, and a treadle, for throwing said air-spindle into and out of rotation, and for simultaneously closing said air-gate and lifting said air-spindle, substantially as specified.

24. In a glass-working machine, in combination, a removable blow-iron, means for rotating the same, a rotary fan, for supplying air to said blow-iron, a register for regulating the amount of air admitted to said fan, a motor, from which the said fan and the said blow-iron derive rotary motion, and automatic means driven by said motor for controlling the register, substantially as specified.

25. In a glass-working machine, in combination, a removable blow-iron, means for rotating the same, a fan supplying air thereto, a rotary main shaft, a register for regulating the supply of air to the said fan, automatic means for operating said register, reciprocating formers traversing on parallel ways in opposite directions, racks and gearing connecting said reciprocating formers with the motor, a sliding gear for disconnecting said racks from the train of gears supplying motion, stops on one of said reciprocating formers for throwing said sliding gear out of mesh, and a treadle with bell-cranks and connections for throwing said sliding gear into connection, substantially as specified.

26. In a glass-working machine, in combination, a rotary fan, a blow-iron, a conduit for supplying air to said blow-iron from said fan, a register for admitting air in variable quantities to said fan, and automatic means for regulating and controlling said register, substantially as specified.

27. In a glass-working machine, in combination, a removable blow-iron, a means for generating a blast of air, means for supplying said air to said blow-iron, and automatic means for regulating and controlling the supply of air to said blast-generator in variable quantities, whereby the air-pressure in the blow-iron is varied in accordance with the demands of the work, substantially as specified.

In testimony whereof I affix my signature in presence of two witnesses.

IRVING W. COLBURN.

Witnesses:
HENRY H. BATES,
ALEXANDER S. STEUART.